（12） United States Patent
Moreau et al.

(10) Patent No.: US 9,883,735 B2
(45) Date of Patent: Feb. 6, 2018

(54) HAND TOOL WITH LANYARD ATTACHMENT LOOP

(71) Applicant: TY-FLOT, INC., Manchester, NH (US)

(72) Inventors: Darrell A. Moreau, Manchester, NH (US); Andre W. Moreau, Bedford, NH (US); Reginald Moreau, Litchfield, NH (US)

(73) Assignee: TY-FLOT, INC, Manchester, NH (US)

( * ) Notice: Subject to any disclaimer, the term of this patent is extended or adjusted under 35 U.S.C. 154(b) by 105 days.

(21) Appl. No.: 15/066,016

(22) Filed: Mar. 10, 2016

(65) Prior Publication Data

US 2017/0258210 A1    Sep. 14, 2017

(51) Int. Cl.
*A45F 5/02* (2006.01)
*G01B 3/56* (2006.01)
*A45F 5/00* (2006.01)

(52) U.S. Cl.
CPC ............... *A45F 5/02* (2013.01); *G01B 3/566* (2013.01); *A45F 2005/006* (2013.01); *A45F 2005/026* (2013.01)

(58) Field of Classification Search
CPC ...................... A45F 2005/026; A45F 2005/006
USPC .................................................. 224/255, 269
See application file for complete search history.

(56) References Cited

U.S. PATENT DOCUMENTS

| | | | | |
|---|---|---|---|---|
| 4,083,481 | A | * | 4/1978 | Selinko ..................... A45F 5/02 224/269 |
| 4,536,925 | A | * | 8/1985 | Boothe ..................... A45F 5/02 16/222 |
| 4,577,374 | A | * | 3/1986 | Lii .......................... A44B 11/28 24/165 |
| 5,414,596 | A | * | 5/1995 | Eaton .................. H01M 2/1005 361/814 |
| 5,664,292 | A | * | 9/1997 | Chen ......................... A45F 5/02 24/3.11 |
| 5,743,582 | A | * | 4/1998 | Rivera .................... B25F 1/003 294/99.2 |
| 5,979,959 | A | | 11/1999 | Rivera |
| 6,032,337 | A | * | 3/2000 | Rankin, Jr. ............... A45F 5/02 24/3.1 |

(Continued)

FOREIGN PATENT DOCUMENTS

| | | |
|---|---|---|
| KR | 101503706 B1 | 3/2015 |
| WO | 030451876 A1 | 6/2003 |

*Primary Examiner* — Brian D Nash
(74) *Attorney, Agent, or Firm* — Mesmer & Deleault, PLLC; Sarita L. Pickett, Esq.

(57) ABSTRACT

A hand tool with a lanyard attachment point has a hand tool body and a working side extending along a portion of the hand tool body and has a straight edge. A pin receiving recess in the hand tool body is parallel to and spaced from the straight edge. A channel extends into the working side transverse to the straight edge and intersects the pin receiving recess. A lanyard loop has an elongated, rigid loop body with a lanyard attaching loop end and a tool attaching end opposite the lanyard attaching loop end. The tool attaching end has a through opening transverse to the loop body where the tool attaching end is disposed in the first channel with the through opening aligned with the pin receiving recess. An anchor pin in the pin receiving recess retains the lanyard loop by extending through the through opening of the tool attaching end.

14 Claims, 10 Drawing Sheets

(56) References Cited

U.S. PATENT DOCUMENTS

| | | | | |
|---|---|---|---|---|
| 6,223,402 B1* | 5/2001 | Lacy | ............ | A45F 5/021 |
| | | | | 24/3.12 |
| 7,308,290 B2* | 12/2007 | Johnson | ............ | H04B 1/385 |
| | | | | 224/268 |
| 7,908,715 B2* | 3/2011 | Ogatsu | ............ | H04M 1/0216 |
| | | | | 224/255 |
| 8,915,361 B2* | 12/2014 | Rayner | ............ | H05K 5/0221 |
| | | | | 206/320 |
| 9,264,088 B2* | 2/2016 | Wojcik | ............ | G06K 7/082 |
| 2005/0274755 A1* | 12/2005 | Lee | ............ | A45F 5/00 |
| | | | | 224/255 |
| 2008/0061058 A1* | 3/2008 | Wang | ............ | H04M 1/0216 |
| | | | | 220/4.02 |
| 2010/0014246 A1* | 1/2010 | Chen | ............ | H04M 1/026 |
| | | | | 361/679.56 |
| 2012/0261444 A1* | 10/2012 | Hoche | ............ | A45F 3/14 |
| | | | | 224/255 |
| 2013/0069499 A1* | 3/2013 | Modrell | ............ | G06F 1/1656 |
| | | | | 312/223.1 |
| 2013/0240578 A1* | 9/2013 | Yu | ............ | H04B 1/385 |
| | | | | 224/197 |
| 2014/0097217 A1* | 4/2014 | Walsh | ............ | A45F 5/021 |
| | | | | 224/268 |
| 2014/0212206 A1 | 7/2014 | Moreau | | |
| 2015/0060476 A1 | 3/2015 | Moreau | | |

\* cited by examiner

HAND TOOL WITH LANYARD ATTACHMENT LOOP

BACKGROUND OF THE INVENTION

1. Field of the Invention

The present invention relates generally to hand tools and more particularly to a hand tool having a tether attachment loop built into the tool.

2. Description of the Prior Art

Carpenters, designers, facilities maintenance personnel, and other workers regularly use hand tools on a job site. Job site safety rules often require workers to tether a hand tool to the worker or structure to prevent inadvertent drops into critical areas. For example, a carpenter's square dropped from an elevated working position can cause serious injury to workers or damage to equipment below. For this reason, the facility may require that all hand tools be tethered to the worker.

Adjustable wrenches and some pliers have a hole defined in the end of the handle. The user can easily connect a tether by clipping through the opening or otherwise securing a tether through the hole.

Mechanic's wrenches, hammers, alignment bars and other elongated tools have traditionally also been difficult to tether. However, one approach to tethering these tools includes attaching a connector loop to the tool using tape or shrink tubing. For example, one tethering method uses heat-shrink tubing to attach a connector strap to a straight section of the tool, where the connector strap includes a D-ring connector. One connector strap known to some as a "web tail" is a length of webbing with a first end looped through the connector and then secured to itself to attach the connector loop to the length of webbing. The first end of the webbing provides a first catch where the end of the webbing is doubled on itself. A second end of the webbing is folded or double folded on itself and then stitched together or otherwise secured in this position to define a second catch where the webbing is doubled or tripled on itself. The web tail is attached to the tool handle by using heat-shrink or cold-shrink tubing positioned around the tool handle with the web tail between the shrink tubing and the tool handle and where the shrink tubing is positioned between the first catch and the second catch. After positioning the shrink tubing, the shrink tubing is reduced in size to conform to the tool handle and web tail, thereby securing the web tail to the tool handle.

SUMMARY OF THE INVENTION

Although some hand tools are built with openings or other geometry that is convenient for attaching a lanyard or tether, other tools continue to challenge the user to find a way to tether the tool. For example, levels and carpenter's squares have outside edges that are used for the tool's function and therefore restrict or eliminate the ability to attach a lanyard without greatly diminishing the tools usefulness.

Figure 1:
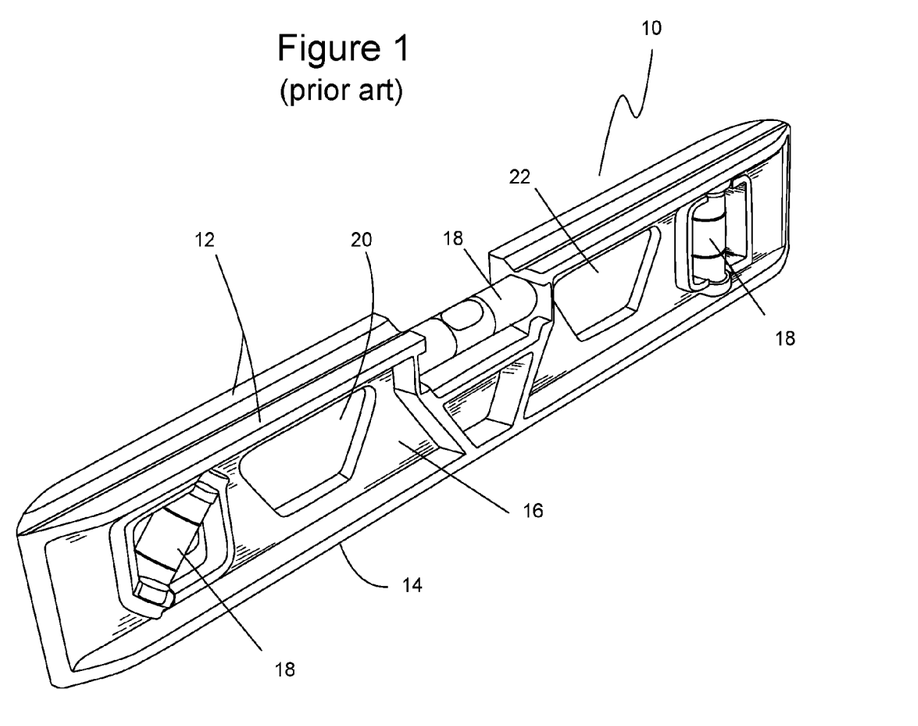
FIG. 1 illustrates a perspective view of one embodiment of a torpedo level of the prior art.

FIG. 1 illustrates a perspective view of one embodiment of a prior-art torpedo level 10. Level 10 has parallel elongated working surfaces 12, 14 that contact the workpiece to determine if it is plumb or level. The body 16 of level 10 between working surfaces 12, 14 houses bubbles 18 and is a structural component that maintains the working surfaces 12, 14 straight and parallel with each other. The level's body 16 defines openings 20, 22, but these openings are surrounded by material that prevents one from clipping a spring clip through the opening. Openings 20, 22 also are adjacent working surfaces 12, 14, so attaching a tether through one of these openings would interfere with using the working surface 12 or 14. Also, tying a cord through opening 20 or 22 would results in a large, inconvenient length of cord or rope that interferes with the level's use.

Figure 2:
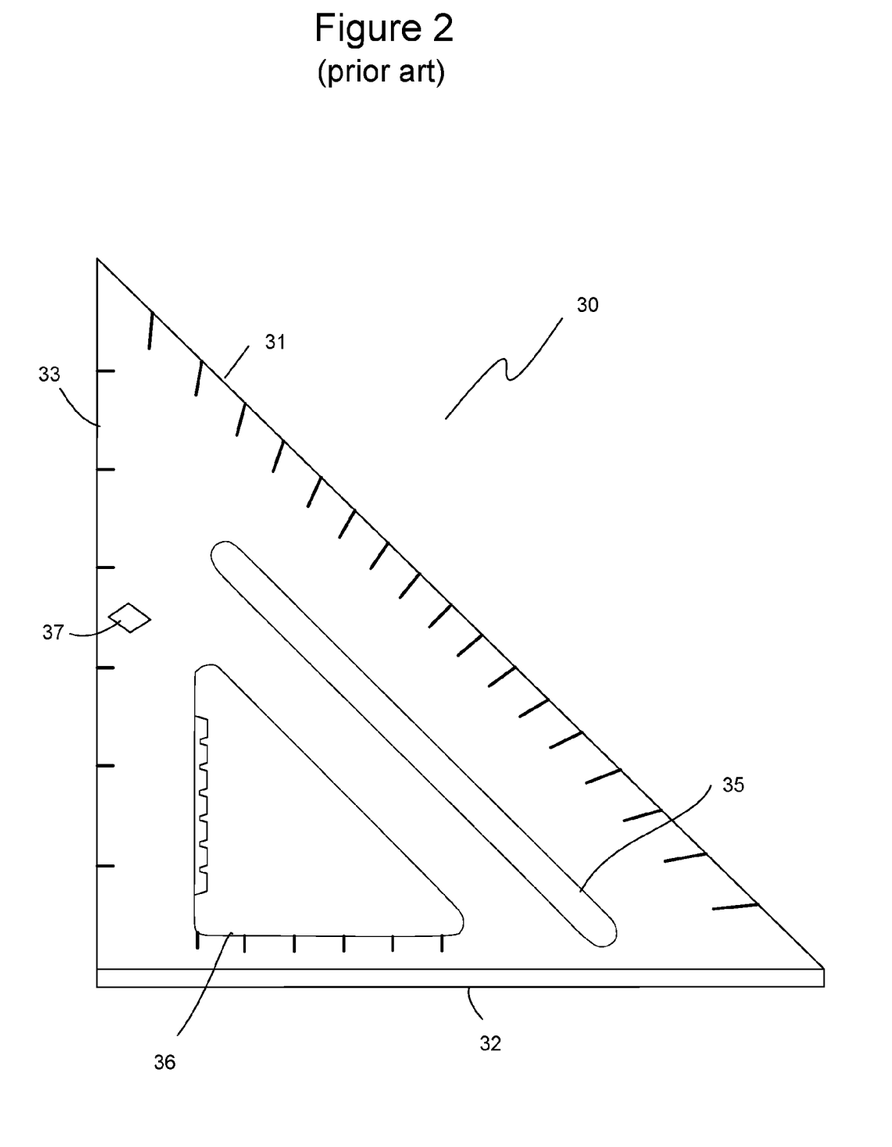
FIG. 2 illustrates an elevational view of one embodiment of a square of the prior art.

FIG. 2 illustrates an elevational view of one embodiment of a prior-art carpenter's square or "speed square" 30. Here, square 30 has a triangular geometry that does not lend itself to attaching a web tail with tape or shrink tubing as discussed above. All three edges 31, 32, 33 of the square 30 have an use, whether it is measurement (edge 33), alignment along another surface (edge 32), or defining and marking angles (edge 31.) Openings 35, 36, 37 in carpenter's square 30 are generally for marking a work piece or gauging the size of a fastener. Openings 35, 36 are also surrounded by significant portions of metal, which makes attaching a tether clip to square 10 difficult or impossible. A lanyard or tether connected through opening 37 would interfere with using working edge 33 as intended. Thus, carpenter's square 30 and other embodiments of squares are particularly difficult to tether without interfering with the use of the tool.

Therefore a need exists for hand tools with a tether attachment loop built into the tool and that reduces or eliminates interference with the tools' function. The present invention achieves these and other objectives by providing a hand tool with an integrated lanyard loop and method of making such a hand tool. The hand tool may be a level, a carpenter's square or "speed" square, a combination square with level and scribe, or any hand tool having a working side with at least a portion of the working side having a straight edge and one or more channels extending into the working side in a direction transverse to the channel(s). A lanyard loop is attached in the channel(s) of the hand tool.

One aspect of the present invention is directed to a hand tool with a lanyard attachment point. In one embodiment, the hand tool has a hand tool body and a working side connected to and extending along a portion of the hand tool body, where at least a portion of the working side has a straight edge. A pin receiving recess is defined in the hand tool body wherein the pin receiving recess extends parallel to and spaced from the straight edge. The hand tool has a first channel that extends into the working side transverse to the straight edge wherein the first channel intersects the pin receiving recess.

A lanyard loop has an elongated, rigid loop body with a lanyard attaching loop end and a tool attaching end opposite the lanyard attaching loop end. The tool attaching end has a through opening transverse to the elongated, rigid loop body where the tool attaching end is disposed in the first channel and the through opening of the tool attaching end aligns with the pin receiving recess. An anchor pin is disposed in the pin receiving recess and extends through the through opening of the tool attaching end of the lanyard loop. Thus, the lanyard loop is rotatably retained by the anchor pin.

In another embodiment, the channel is configured to permit the lanyard loop to rotate away from the straight edge.

In another embodiment, the hand tool has a second channel defined in the hand tool. The second channel extends into the working side transverse to the straight edge, is spaced apart from and parallel to the first channel, and intersects the pin receiving recess.

In another embodiment, the elongated, rigid loop body includes a pair of parallel, loop body legs spaced a predefined distance from each other, where the predefined distance permits disposing the pair of parallel, loop body legs into the first channel and the second channel. The lanyard attaching loop end is directly connected to a first leg end of each of the pair of parallel, loop body legs. A tool attaching end is opposite the first leg end of each of the pair of parallel, loop body legs. Each tool attaching end of the pair of parallel, loop body legs has a through opening aligned with each other and disposed in the respective first channel or second channel, where each through opening of the tool attaching end of the pair of parallel, loop body legs intersects the pin receiving recess.

In another embodiment, the lanyard attaching loop end is angled to the elongated loop body.

In another embodiment, the lanyard attaching loop end is rotatably connected to the elongated loop body.

In another embodiment of a hand tool with an integrated lanyard attachment point, the hand tool has a hand tool body and a working side connected to and extending along a portion of the hand tool body. At least a portion of the working side has a straight edge. A slot extends into the hand tool through the straight edge and defines a socket shaped to receive a spherical object. A lanyard loop has an elongated, rigid loop body extending between a lanyard attaching loop end and a tool attaching end with a spherical shape. The tool attaching end is securely received in the socket with the lanyard loop being capable of rotating about the tool attaching end and pivoting about the tool attaching end along the slot.

Another aspect of the present invention is directed to a method of providing a lanyard attachment point on a hand tool. In one embodiment, the method includes providing a hand tool having a hand tool body and a working side along a portion of the hand tool body, where at least a portion of the working side is a straight edge and a pin receiving recess is defined in the hand tool body. The pin receiving recess extends parallel to and is spaced from the straight edge. The straight edge has a first channel that extends into the hand tool body and transverse to the straight edge, where the first channel intersects the pin receiving recess. The method also includes providing a lanyard loop having an elongated, rigid loop body with a lanyard attaching loop end and a tool attaching end opposite the lanyard attaching loop end, the tool attaching end having a through opening transverse to the elongated, rigid loop body. The method also includes providing an anchor pin, inserting the tool attaching end of the lanyard loop into the first channel of the straight edge, aligning the through opening of the tool attaching end with the pin receiving recess, and inserting the anchor pin into the pin receiving recess and through the through opening of the tool attaching end of the lanyard loop to rotatably retain the lanyard loop to the straight edge of the hand tool.

In another embodiment, the hand tool providing step includes providing a channel that permits the lanyard loop to rotate away from the straight edge so as to not interfere with use of the straight edge.

Another aspect of the present invention is directed to a method of making a hand tool having a working side with a straight edge and having a non-interfering lanyard attachment point. In one embodiment, the method includes forming a first channel in a portion of the straight edge, where the first channel is transverse to the straight edge, and rotatably attaching a lanyard loop having an elongated, rigid loop body to the first channel where the lanyard loop rotates within the first channel about a tool attaching end of the lanyard loop sufficiently so that the lanyard attachment point does not interfere with use of the straight edge of the hand tool.

In another embodiment, the method also includes providing a lanyard loop having a lanyard attaching loop end angled to the elongated, rigid loop body. In another embodiment, the method includes providing a lanyard loop having a lanyard attaching loop end rotatably attached to the elongated, rigid loop body.

In another embodiment, the method also includes (1) providing a second channel disposed in the portion of the straight edge, where the second channel is transverse to the straight edge and parallel to the first channel; and (2) providing a pair of parallel, loop body legs that form the elongated, rigid loop body, where the pair of parallel, loop body legs each has a tool attaching end rotatably attached to one of the first channel and the second channel.

In another embodiment, the method includes providing a lanyard loop having a lanyard attaching loop end that is angled to the elongated, rigid loop body. In another embodiment, the method includes providing a lanyard loop having a lanyard attaching loop end that is rotatably connected to the elongated, rigid loop body.

DETAILED DESCRIPTION

Figure 3:
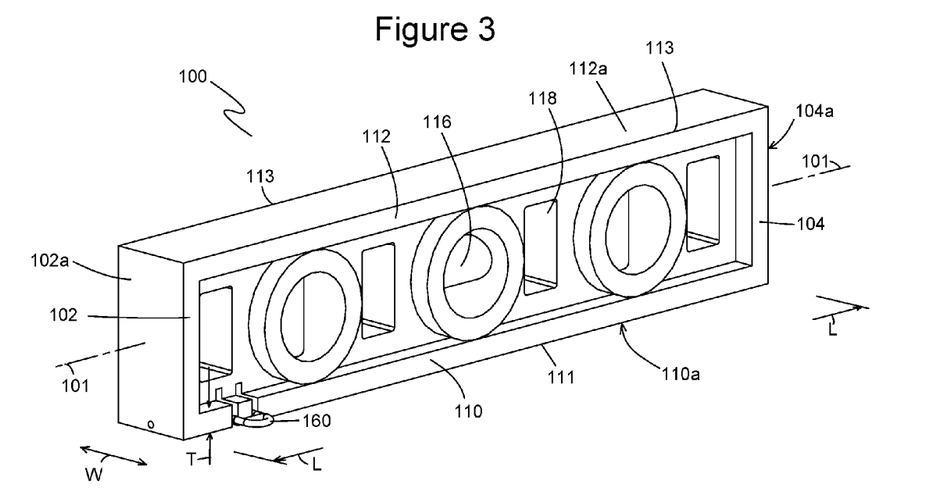
FIG. 3 is a perspective view of another embodiment of a hand tool with a lanyard loop installed in the first working side.

The preferred embodiments of the present invention are illustrated in FIGS. 3-12. Referring to FIG. 3, a front, perspective view illustrates one embodiment of a hand tool 100 with a lanyard loop 160. As shown in FIG. 3, hand tool 100 is a level with a tool body 106 extending longitudinally along longitudinal axis 101 from a first tool end 102 to a second tool end 104. A first working side 110 is connected to and extends along at least a portion of tool body 106. When hand tool 100 is a level as shown, a second working side 112 is spaced from and extends parallel to first working side 110. Lanyard loop 160 is constructed to connect to a lanyard or tether 190 (shown in FIG. 7.)

First working side 110 has a first working surface 110a and a straight edge 111 extending along all or part of first working side 110. Second working side 112 has a second working surface 112a and second straight edge 113 extending along all or part of second working side 112. First working side 110 has a width W and a thickness T, each of which may be constant or vary along a length L of first working side 110. Optionally, first end 102 and/or second end 104 are also constructed with a first end working surface 102a and second end working surface 104a, respectively. When present, one or both of first end 102 and second end 104 extend perpendicular to first working side 110. In some embodiments, such as when hand tool 100 is a level, first end 102 and second end 104 extend parallel to each other between first working side 110 and second working side 112. For example, first working side 110, second working side 112, first end 102 and second end 104 define a rectangular frame around tool body 106. Tool body 106 includes functional elements of hand tool 100, such as bubble vials 116, openings 118, measurement indicia (not shown), and the like. Tool body 106 may have a rectangular, triangular, or other regular or irregular geometric shape.

Figure 4:
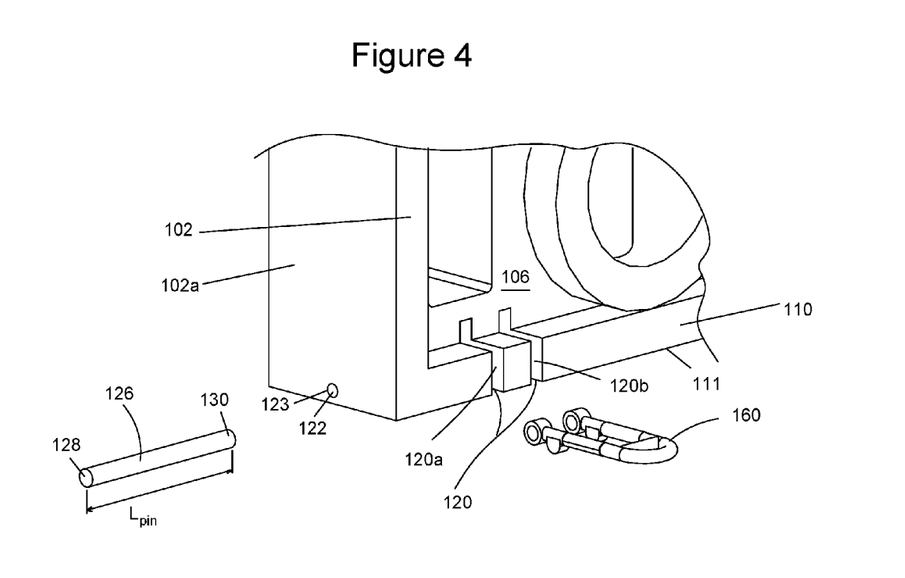
FIG. 4 is a perspective, close-up view of part of the hand tool of FIG. 3 showing lanyard loop and anchor pin disassembled from the hand tool.

Turning now to FIG. 4, a perspective view illustrates part of first tool end 102 and first working side 110 of hand tool 100 of FIG. 3. In FIG. 4, components of lanyard loop 160 are shown disassembled from hand tool 100. A pin receiving recess 122 extends axially into first working side 110. Pin receiving recess 122 is spaced from and extends parallel to first working surface 110a and straight edge 111. Pin receiving recess 122 in one embodiment is a smooth bore. In other embodiments, pin receiving recess 122 is threaded. Optionally, pin receiving recess 122 has a recessed or enlarged entrance 123 to accept and recess a fastener head (not shown) or the like into first end 102 of hand tool 100.

Pin receiving recess 122 is sized and constructed to receive an anchor pin 126, which may be a spring pin (also known as a tension pin, roll pin, or C pin), a threaded machine screw, dowel pin, or other pin or fastener. Anchor pin 126 has a pin length $L_{pin}$ from a first pin end 128 to a second pin end 130. In some embodiments, anchor pin 126 is a spring pin having a diameter of 1/32", 1/16", or greater and a length $L_{pin}$ of about one inch.

One or more channels 120 extend through first working surface 110a and into first working side 110 towards tool body 106. In some embodiments, channel(s) 120 extend partially into tool body 106 for an increased range of rotational motion of lanyard loop 160 about anchor pin 126. Channel(s) 120 are oriented transverse (e.g., perpendicular) to straight edge 111. In one embodiment, channel(s) 120 include a first channel 120a and a second channel 120b, where channels 120 are oriented perpendicular to straight edge 111, perpendicular to tool body 106, and parallel with first end working surface 102a. Lanyard loop 160 is partially received in channel(s) 120 and is rotatably retained by anchor pin 126, which has pin length $L_{pin}$ sufficient to extend across channel(s) 120.

Figure 5:
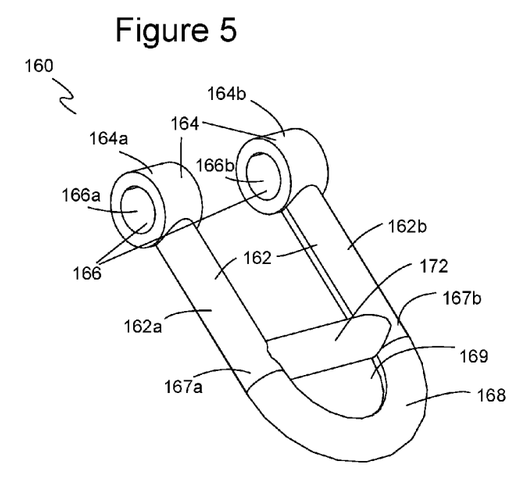
FIG. 5 is a perspective view of one embodiment of a lanyard loop with parallel loop body legs.

Turning now to FIG. 5, a perspective view illustrates one embodiment of lanyard loop 160 with an elongated rigid loop body 162 extending between a tool attaching end 164 and a lanyard attaching loop end 168. Here, loop body 162 comprises a pair of parallel, spaced-apart loop body legs 162a,162b. Loop body legs 162a, 162b are spaced apart so that one loop body leg 162a extends into a first channel 120a and the other loop body leg 162b extends into a second channel 120b. A first end 167 of each of loop body leg 162 directly connects to lanyard attaching loop end 168. Each loop body leg 162a, 162b also connects to tool attaching end 164 defining a through opening 166. Loop body legs 162a, 162b can be straight, angled, or curved.

Tool attaching end 164 could be one or more cylinders or blocks defining a through opening 166. Here, tool attaching end 164 comprises first tool attaching end 164a with through opening 166a and second tool attaching end 164b with through opening 166b. Through-opening 166a is axially aligned with through-opening 166b to receive anchor pin 126 therethrough.

Lanyard attaching loop end 168 defines a partially or completely closed loop 169. In one embodiment, lanyard attaching loop end 168 has a curve 170 or angle extending between and connecting first end 167a of first loop body leg 162a and first end 167b of second loop body leg 162b. An optional cross piece 172 extends transversely between first and second loop body legs 162a, 162b to define closed loop 169. In some embodiments, loop body legs 162a, 162b and lanyard attaching loop end 168 define a U-shape that is open at tool attaching end 164. In such an embodiment, anchor pin 126 closes the U-shape to define closed loop 169 when anchor pin 126 extends through through-openings 166a, 166b of tool attaching end 164. Lanyard attaching loop end 168 can have any of a variety of shapes, including a U-shape, a V-shape, a curve, a bracket, a transverse cross piece, a circle, and other shapes connected between first and second loop body leg 162a, 162b.

Figure 6:
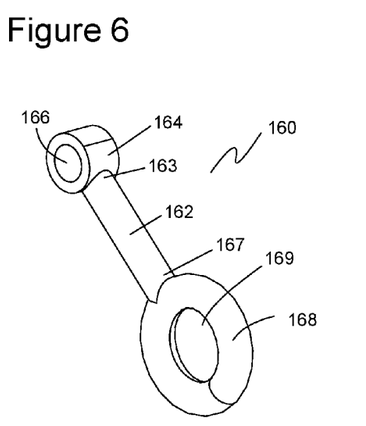
FIG. 6 is a perspective view of another embodiment of a lanyard loop of the present invention showing a single, straight loop body extending between a tool attaching end and a lanyard attaching end.

FIG. 6 is a perspective illustration of another embodiment of lanyard loop 160. Similar to embodiments discussed above, lanyard loop 160 has an elongated, rigid loop body 162 connected at a first end 167 to lanyard attachment loop end 168 and at a second end 163 to tool attaching end 164, where loop body 162 can be straight, angled, or curved. Tool attaching end 164 in this embodiment is a ring, block, or other structure that defines through-opening 166 to receive anchor pin 126 therethrough. Thus, with channel 120 extending through first working side 110 towards or into tool body 106, lanyard loop 160 can rotate about anchor pin 126 and out of a path of first working surface 110a (shown in FIG. 3).

In this embodiment, lanyard attaching loop end 168 is an annulus, ring, square, or other geometry connected to loop body 162 and defining closed loop 169. In some embodiments, lanyard attaching loop end 168 pivots about loop body 162, or relative to tool attaching end 164, to reduce coiling of a lanyard or tether 190 (shown in FIG. 7) connected through closed loop 169.

Figure 7:
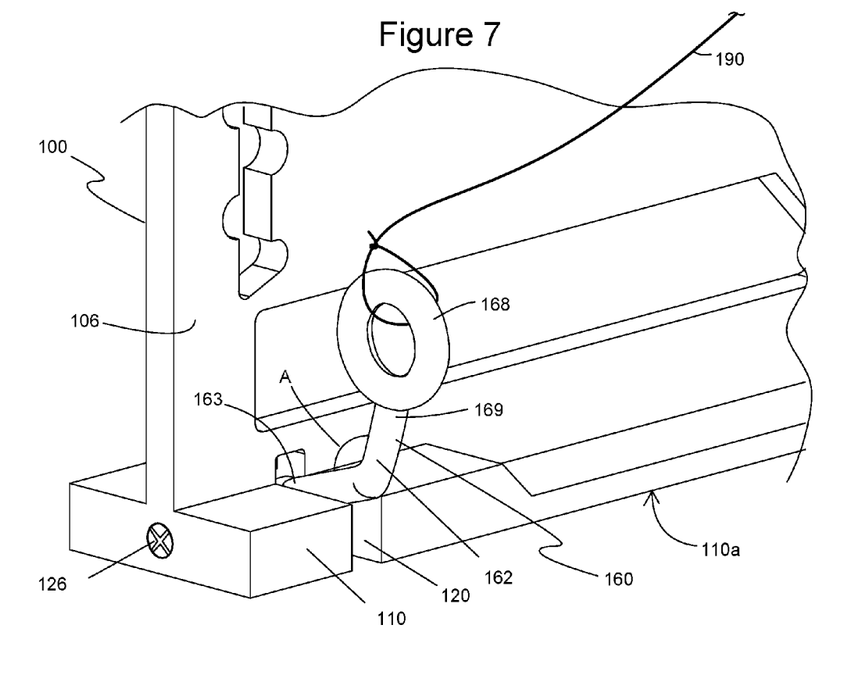
FIG. 7 is a perspective view showing an end portion of another embodiment of a hand tool equipped with an embodiment of a lanyard loop that has an angled loop body, where the lanyard loop is rotated away from the bottom or working surface.

Referring to FIG. 7, a perspective view illustrates part of hand tool 100 with another embodiment of lanyard loop 160 installed in channel 120 of first working side 110. Here, loop body 162 defines an angle A from about 20° to 90° between first end 169 and second end 163. Thus, as lanyard loop 160 rotates about anchor pin 126 away from first working surface 110a, lanyard attaching loop end 168 extends upward adjacent tool body 106 to the extent permitted by depth of channel 120 and by the geometry of tool body 106 and first working side 110. In some embodiments, lanyard loop 160 can rotate until lanyard attaching loop end 168 contacts tool body 106. Whether straight, angled, or curved, lanyard loop 160 can rotate towards tool body 106 and out of the way of first working surface 110a with lanyard 190 attached to lanyard attaching loop end 168. Similarly, lanyard loop 160 can rotate away from and out of the way of tool body 106. Therefore, depending on the portion of hand tool 100 to be used, lanyard loop 160 can be rotated so as to not interfere with its use.

Figure 7A:
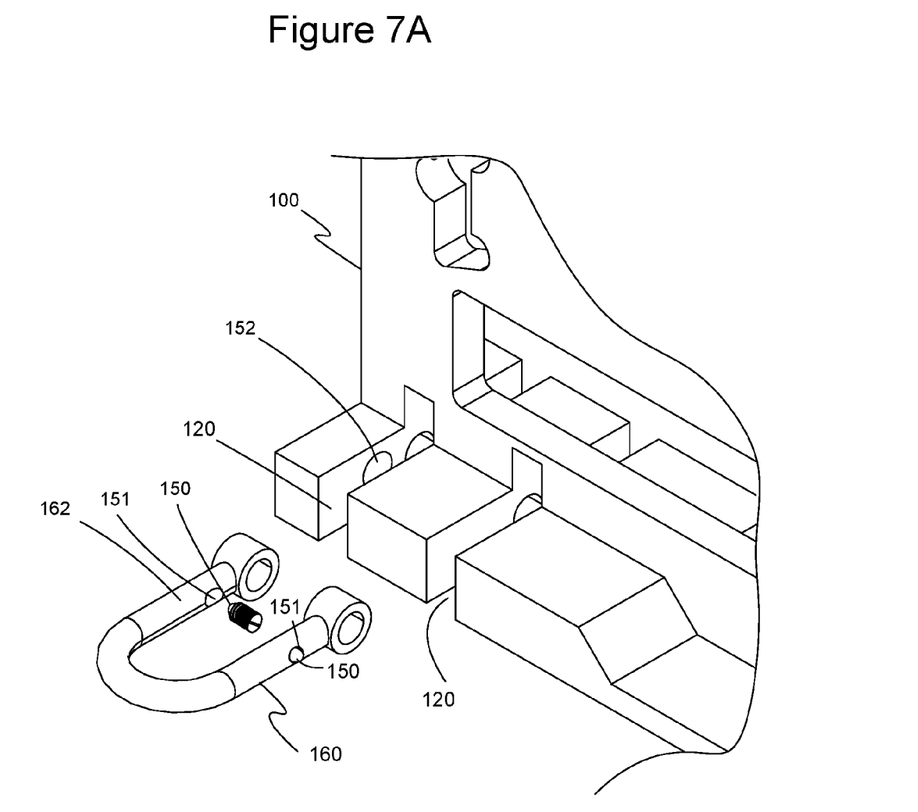
FIG. 7A is a perspective view showing a portion of a hand tool and an embodiment of a lanyard loop that includes a protrusion that can be adjustably installed in the loop body to retain the lanyard loop in a stowed position by engaging a recess in one of the slots.

Referring now to FIG. 7A, a perspective view shows another embodiment of lanyard loop 160 and slots 120 of hand tool 100. In some embodiments, one or more protrusions 150 on lanyard loop 160 provide a friction fit with hand tool 100 to hold and retain lanyard loop 160 in a stowed position when not in use with tether or lanyard 190. As shown in FIG. 7A, protrusions 150 are a ball plunger set screws installed in leg openings 151 and extend to protrude from lanyard loop body 162. When protrusion 150 is retained in lanyard loop 160, as lanyard loop 160 is rotated in slots 120, it reaches a position where protrusion 150 aligns with and is partially received in a recess or opening 152 in slot 120 to maintain lanyard loop 160 in a stowed position. Other protrusions 150 may be used, such as those creating a snap fit or interference fit sufficient to maintain lanyard loop 160 in a stowed position, but permitting the user to overcome the resistance provided by the protrusion 150 to rotate lanyard loop 160 out of the stowed position. When protrusion 150 is a ball plunger set screw, protrusion 150 is spring biased, where advancing the ball plunger set screw increases the amount of interference between lanyard loop 160 and hand tool 100 as desired by the user.

Figure 7B:
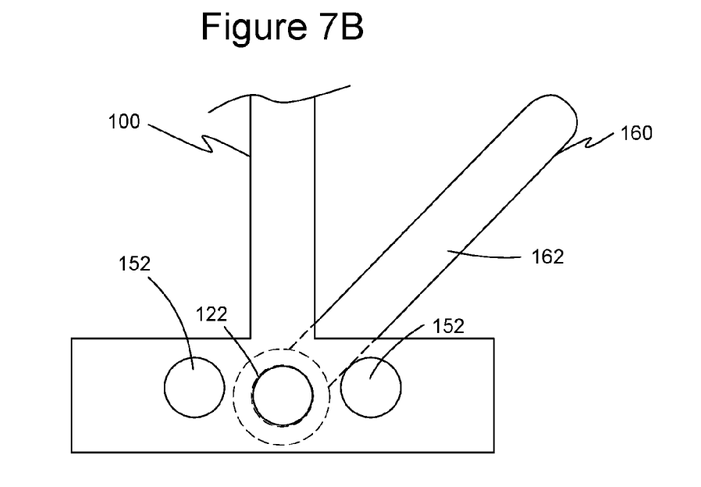
FIG. 7B is an end elevational view of a portion of a hand tool showing openings to receive a ball plunger set screw.

Referring now to FIG. 7B, an end elevational view illustrates an embodiment of hand tool 100 with lanyard loop 160. In this embodiment, openings 152 on opposite sides of pin receiving recess 122 receive ball plunger set screws, where the ball is a protrusion 150 that extends into channels 120 (shown in FIG. 7A) to engage loop body 162 an maintain it in a stowed position. Other fasteners could be used in place of ball plunger set screws. In other embodiments, protrusion 150 is installed in opening 152 of hand tool 100 and engages lanyard loop body 162 to retain lanyard loop 160 in the stowed position. When protrusion 150 is retained or housed in hand tool 100, lanyard loop 160 can be rotated to a position where protrusion 150 engages lanyard loop body 162 to retain the stowed position, such as the position shown in FIG. 7B. In other embodiments, inside faces of one or both channels 120 may include a protrusion 150 that extends into the respective channel 120.

Figure 7C:
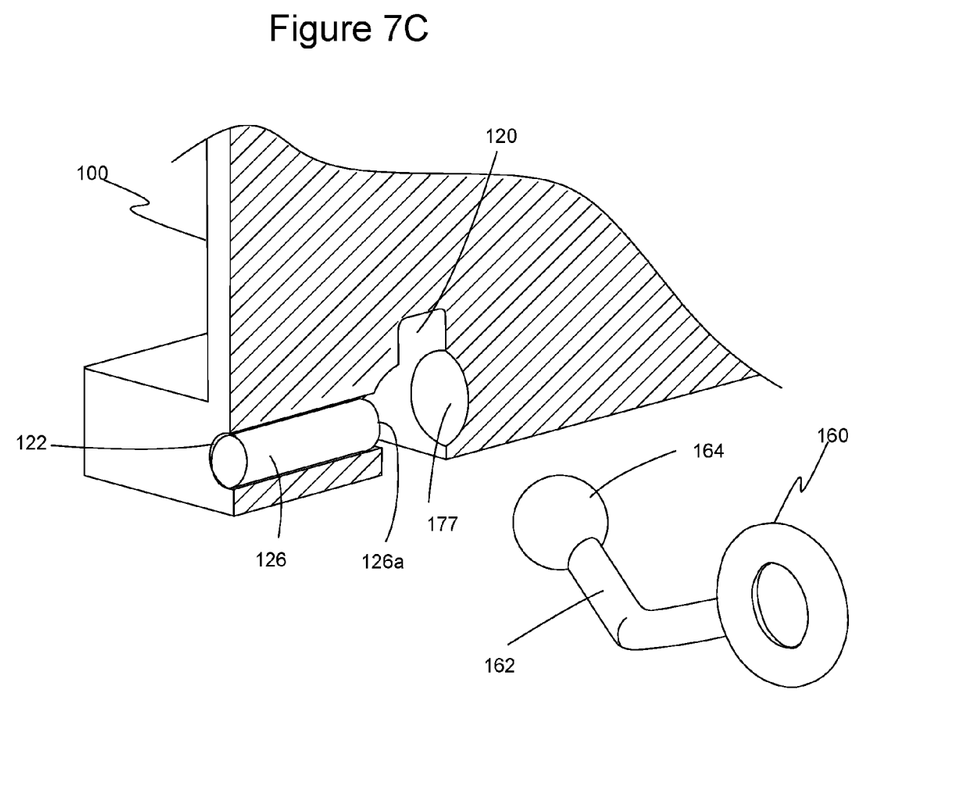
FIG. 7C is a perspective, sectional view of a portion of a hand tool showing a ball-and-socket fit between the lanyard loop and the slot of the hand tool.

Referring now to FIG. 7C, a perspective, sectional view illustrates part of hand tool 100 and lanyard loop 160 with a ball-and-socket connection. Tool attaching end 164 of lanyard loop 160 has a spherical shape that is received by a corresponding socket 177 in slot 120 of hand tool 100. To permit lanyard loop 160 to spin about loop body 162 as well as pivot about attaching end 164, socket 177 defines part of a spherical shape sized to mate with tool attaching end 164. When installed in pin receiving recess 122, anchor pin 126 prevents tool attaching end 164 of lanyard loop 160 from being removed from socket 177. In some embodiments, anchor pin 126 partially blocks channel 120 below socket 177 to prevent passage of tool attaching end 164 through slot 120. In other embodiments, anchor pin 126 has a concave pin end 126a that mates with tool attaching end 164 and forms part of socket 177 to retain tool attaching end 164 in socket 177.

Figure 8:
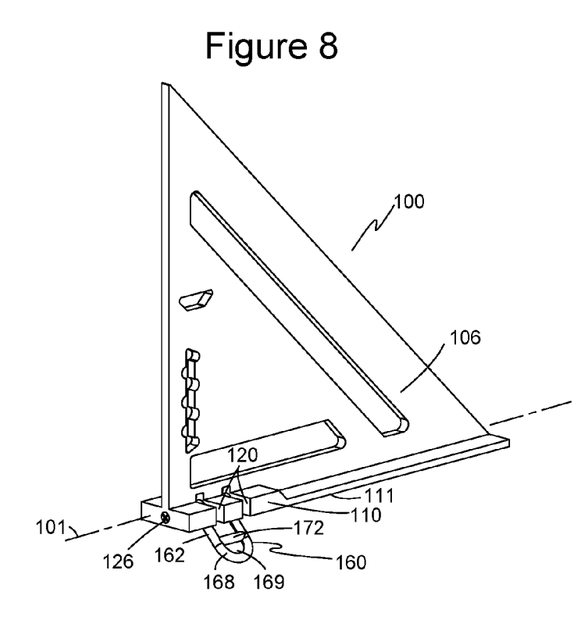
FIG. 8 is a perspective view of another embodiment of a hand tool of the present invention equipped with the lanyard loop of FIG. 5.

Referring now to FIG. 8, there is illustrated a perspective view of another embodiment of hand tool 100 with lanyard loop 160 with loop body 162 installed in slots 120 extending through first working side 110 and partially into tool body 106. In this embodiment, hand tool 100 is a carpenter's square or "speed square" that has a triangular tool body 106 connected perpendicularly to and extending along first working side 110. As with hand tool 100 of FIG. 3, first working side 110 extends along longitudinal axis 101 and has straight edge 111. Anchor pin 126 is disposed in pin receiving recess 122 to retain lanyard loop 160, yet allowing it to rotate about anchor pin 126. Cross piece 172 defines closed loop 169 in lanyard attachment end 168, where closed loop 169 is sized to receive a lanyard connector (not shown), such as a spring clip, carabiner, or the like. Cross piece 172 is positioned along loop body 162 to clear first working side 110 as lanyard loop 160 rotates out of the way of first working surface 110a with lanyard 190 attached where it does not interfere with using first working surface 110a.

Figure 8A:
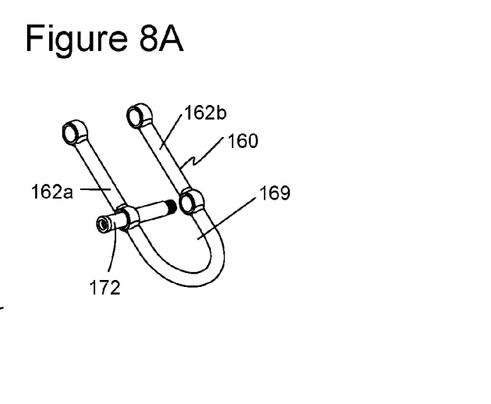
FIG. 8A is a perspective view of another embodiment of a lanyard loop of the present invention.

Referring to FIG. 8A, another embodiment of lanyard loop 160 is shown. In this embodiment, cross piece 172 is a locking pin that is installed between loop body legs 162a, 162b to define closed loop 169. In one embodiment, cross piece 172 is a spring pin or dowel pin with a circumferential recess to receive a snap ring that locks with lanyard loop 160.

Figure 9:
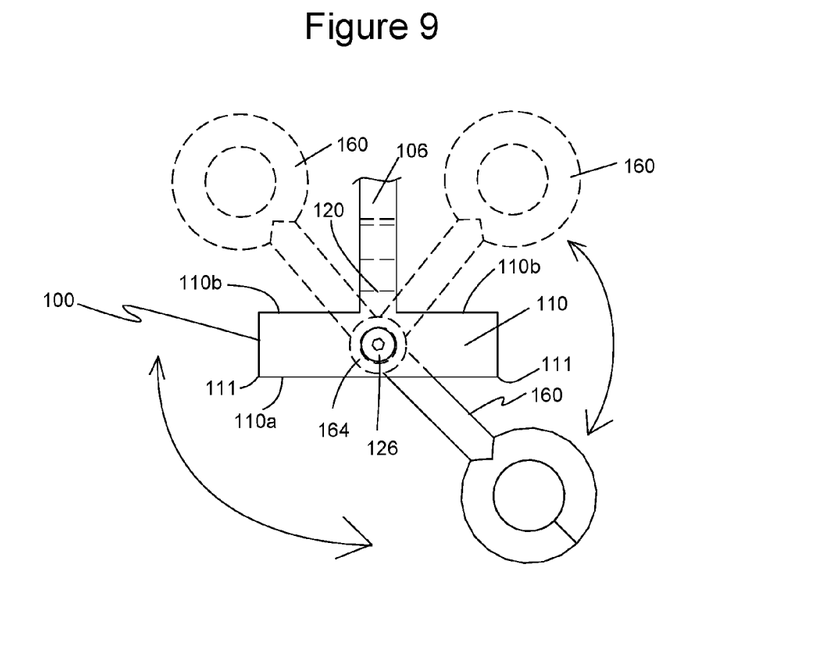
FIG. 9 is an end elevational view of a portion of the hand tool of FIG. 8 equipped with the lanyard loop of FIG. 6 and showing various positions of the lanyard loop.

Referring now to FIG. 9, an end, elevational view shows a portion of hand tool 100 of FIG. 8 equipped with another embodiment of lanyard loop 160 such as shown in FIG. 6. Anchor pin 126 extends axially into first working side 110 of hand tool 100 and through tool attaching end 164 of lanyard loop 160. Anchor pin 126 extends parallel to straight edges 111 and is positioned directly below tool body 106 and approximately at the center of first working side 110. Lanyard loop 160 can rotate about anchor pin 126 between various positions shown in broken lines. Accordingly, lanyard loop 160 may be rotated through slot 120 away from top surface 110b of first working side 110 to either side of tool body 106, or to a position adjacent tool body 106 and away from first working surface 110a (bottom surface as shown).

Figure 10A:
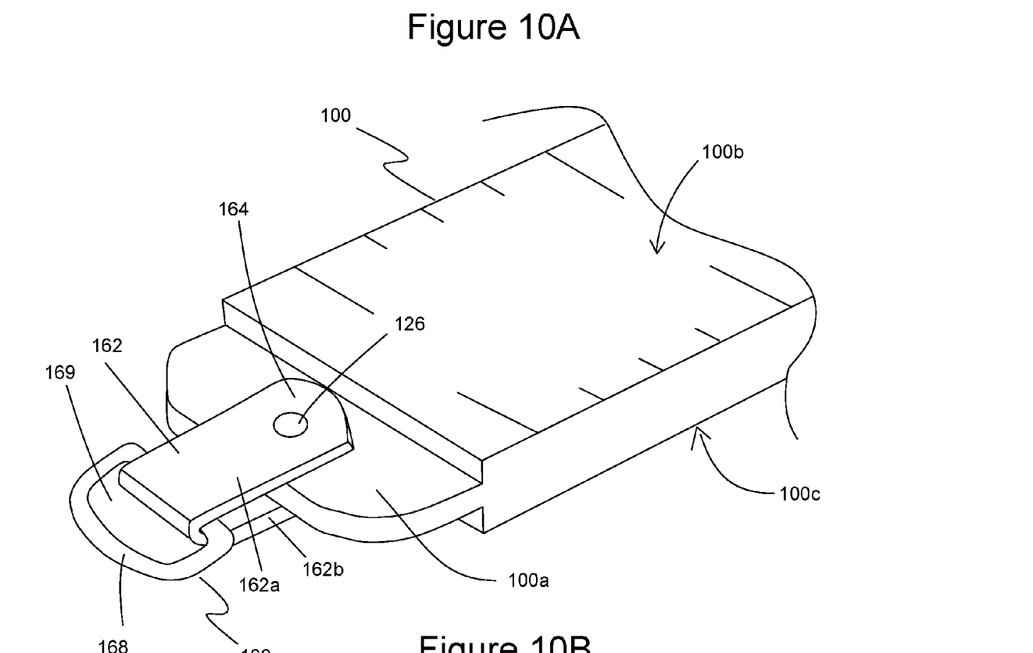
FIG. 10A is a perspective view of an end portion of another hand tool showing one embodiment of a lanyard loop of the present invention attached to the end portion using a U-shaped attachment.
Figure 10B:
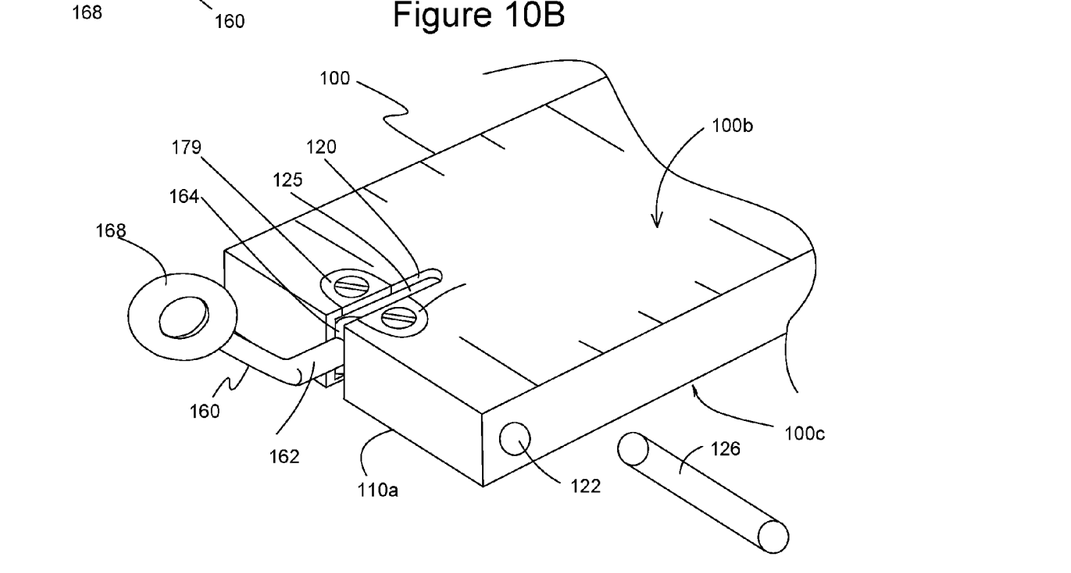
FIG. 10B is a perspective view of an end portion of another hand tool showing another embodiment of a lanyard loop of the present invention attached to the end portion through a hollow slot extending into the end of the hand tool.

Referring now to FIGS. 10A and 10B perspective views illustrate an end portion 100a of another embodiment of a hand tool 100, such as a carpenter's square. In FIG. 10A, lanyard loop 160 has a U-shaped loop body 162 looped through closed-loop 169 of lanyard attaching end 168 with loop body legs 162a, 162b extending over opposite sides of end portion 100a. Anchor pin 126 extends through tool attaching end 164 and end portion 100a of hand tool 100 to secure lanyard loop 160. In one embodiment, end portion 100a has a reduced thickness compared to the adjacent portion of hand tool 100, where the reduced thickness allows attachment of lanyard loop 160 without interfering with the use of principal faces 100b, 100c. For example, lanyard connecting end 168 is free to move between loop body legs 162a, 162b of U-shaped loop body 162 between up, down, and horizontal positions as needed by the user.

FIG. 10B is a perspective view of the end portion 100a of another hand tool 100 showing an embodiment of lanyard loop 160 attached to the end portion 100a through a hollow slot 120 extending through straight edge 110a and into end portion 100a. Since a carpenter's square has many straight edges 110a, slot 120 could similarly extend through other straight edges of hand tool 100.

As shown in FIG. 10B, tool attaching end 164 is received in slot 120 with loop body 162 extending horizontally out of slot 120. In one embodiment, tool attaching end 164 is a ball or T that is received in slot 120 and has a greater size than slot 120. For example, tool attaching end 164 is a ball that is installed in a hollow region 125 after removing removable cover(s) 179 adjacent slot 120 to enable access to a hollow region 125 in end portion 100a. Tool attaching end 164 (e.g., a ball) has a size that is larger than slot 120, therefore maintaining lanyard loop 160 attached to hand tool 100. As shown FIG. 10B, slot 120 allows lanyard loop 160 to freely rotate about loop body 162 as well as to move within slot 120 to extend upward away from principal face 100b, horizontally from end portion 110a, or downward away from principal face 100c so as not to interfere with use of hand tool 100. Similar to embodiments discussed above, tool attaching end 104 alternately may be connected to end portion 100a by anchor pin 126 extending into pin receiving recess 122.

Figure 11:
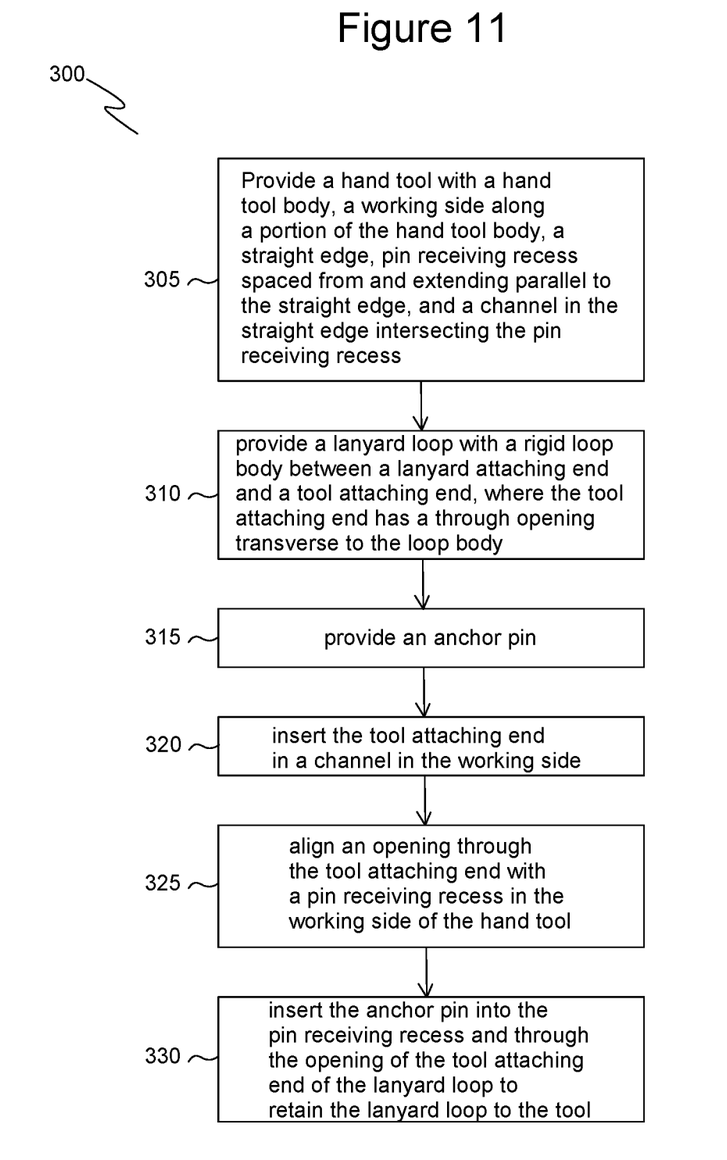
FIG. 11 is a flow chart illustrating steps in one embodiment of a method of the present invention of providing a lanyard attachment point on a hand tool.

Referring now to FIG. 11, a flowchart illustrates steps in one embodiment of a method 300 of providing a lanyard attachment point on a hand tool 100. In step 305, a hand tool 100 is provided, where the hand tool 100 has a hand tool body 106 and a working side 110 along a portion of the hand tool body 106 with at least a portion of the working side being a straight edge 111. The hand tool 100 defines a pin receiving recess 122 extending parallel to and spaced from the straight edge 111. The straight edge 111 has a first channel 120a that extends into the hand tool 100 and transverse to the straight edge 111, where the first channel 120a intersects the pin receiving recess 122. Step 305 optionally includes selecting the hand tool 100 such that the channel 120 permits the lanyard loop 160 to rotate away from the straight edge 111 so as to not interfere with use of the 111 straight edge or working side 110.

In step 310, a lanyard loop 160 is provided, where the lanyard loop 160 has an elongated, rigid loop body 162 with a lanyard attaching loop end 168 and a tool attaching end 164 opposite the lanyard attaching loop end 168, and where the tool attaching end 164 has a through opening 166 transverse to the elongated, rigid loop body 162.

In step 315, an anchor pin 126 is provided.

In step 320, the tool attaching end 164 of the lanyard loop 160 is inserted into the first channel 120a.

In step 325, the through opening 166 of the tool attaching end 164 is aligned with the pin receiving recess 122.

In step 330, the anchor pin 126 is inserted into the pin receiving recess 122 and through the through opening 166 of the tool attaching end 164 of the lanyard loop 160, thereby rotatably retaining the lanyard loop 160 to the hand tool 100.

Figure 12:
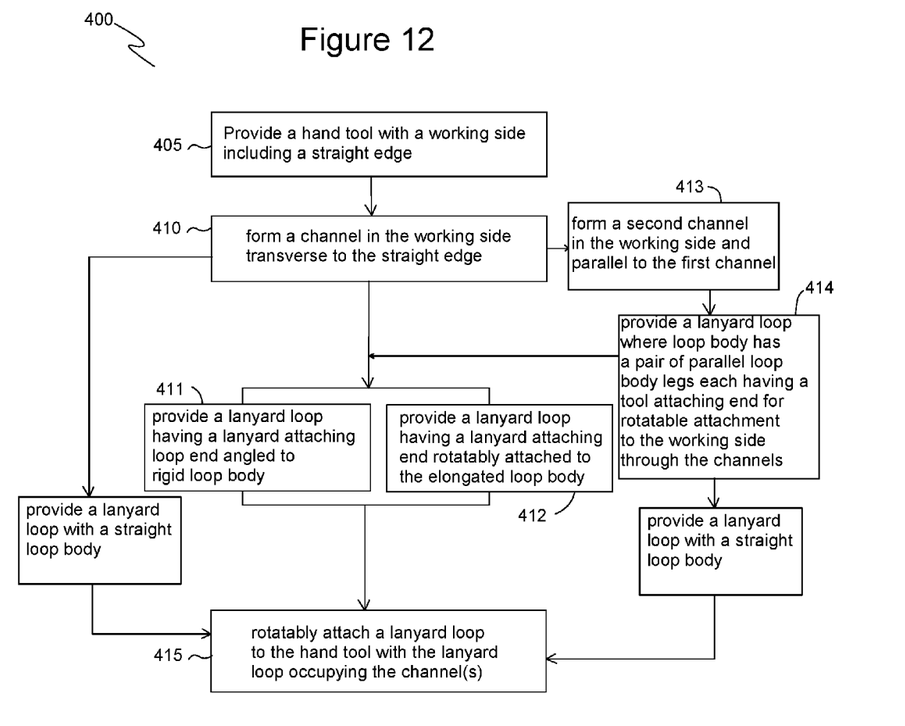
FIG. 12 is a flow chart illustrating steps in another embodiment of a method of the present invention of providing a hand tool with a working side having a straight edge and a non-interfering lanyard attachment point.

Referring now to FIG. 12, a flow chart illustrates steps in a method 400 of providing a hand tool 100. In step 405, a hand tool 100 is provided, where hand tool 100 has a working side 110 with one or more straight edge 111 and a non-interfering lanyard attachment point. In one embodiment, lanyard loop 160 is selected as having a lanyard attaching loop end 168 that is angled to the elongated, rigid loop body 162. In another embodiment, lanyard loop 160 is selected to have a lanyard attaching loop end 168 that is rotatably connected to the elongated, rigid loop body 162.

In step 410, a first channel 120 is formed in a portion of the straight edge 111, where the first channel 120 is transverse to the straight edge 111.

In step 415, a lanyard loop 160 having an elongated, rigid loop body 162 is rotatably attached to the hand tool 100 through the first channel 120, where the lanyard loop 160 rotates sufficiently within the first channel 120 about a tool attaching end 164 so that the lanyard attachment point, such as a closed loop 169 at the lanyard attaching loop end 168 of the lanyard loop 160, does not interfere with use of the straight edge 111 or working side 110 of the hand tool 100.

In one embodiment of method 400, step 411 is performed prior to step 415. In step 411, a lanyard loop 160 is provided, where the lanyard loop 160 has a lanyard attaching loop end 168 angled to the elongated, rigid loop body 162.

In another embodiment of method 400, step 412 is performed in place of step 411. In step 412, a lanyard loop 160 is provided, where the lanyard loop 160 has a lanyard attaching loop end 168 rotatably attached to the elongated, rigid loop body 162.

In another embodiment of method 400, steps 413 and 414 are performed prior to step 415. In step 413, a second channel 120 is formed in the straight edge 111, where the second channel 120 is also transverse to the straight edge 111 and parallel to the first channel 120. In step 414, the lanyard loop 160 is selected as having a pair of parallel, loop body legs 162a, 162b that form the elongated, rigid loop body 162, where the pair of parallel, loop body legs 162a, 162b each has a tool attaching end 164a, 164b, respectively, that are rotatably attachable to the hand tool 100 through the first and second channels 120.

In use, embodiments of hand tool 100 with lanyard loop 160 are useful for attaching a lanyard or tether 190 to prevent accidental drops of hand tool 100. By being able to rotate about anchor pin 126, lanyard loop 160 can be moved out of the way with the lanyard 190 attached where it does not interfere with using a selected portion of hand tool 100. Hand tool 100, lanyard loop 160, and anchor pin 126 are commonly made of steel, aluminum, or other metals. Other materials are also acceptable and include plastic, carbon fiber, and fiberglass. In one embodiment, lanyard loop 160 is constructed to hold 200 pounds of static weight per pound of weight of hand tool 100. In some embodiments, lanyard attaching loop end 168 is sized to accept a connector with a diameter of ¼" or greater.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A hand tool with a lanyard attachment point, the hand tool comprising:
   a hand tool having a hand tool body and a working side connected to and extending along a portion of the hand tool body wherein at least a portion of the working side has a straight edge, a pin receiving recess in the hand tool body, wherein the pin receiving recess extends parallel to and is spaced from the straight edge, and the hand tool having a first channel that extends into the working side transverse to the straight edge, wherein the first channel intersects the pin receiving recess;
   a lanyard loop having an elongated, rigid loop body with a lanyard attaching loop end, and a tool attaching end opposite the lanyard attaching loop end, the tool attaching end having a through opening transverse to the elongated, rigid loop body, wherein the tool attaching end is disposed in the first channel and the through opening of the tool attaching end aligns with the pin receiving recess; and an anchor pin disposed in the pin receiving recess and extending through the through opening of the tool attaching end of the lanyard loop, the lanyard loop being rotatably retained by the anchor pin, wherein in any rotated position, the lanyard loop defines a closed loop capable of retaining a lanyard.

2. The hand tool of claim 1 wherein the channel is configured to permit the lanyard loop to rotate away from the straight edge.

3. The hand tool of claim 1 further comprising a second channel defined in the hand tool wherein the second channel extends into the working side transverse to the straight edge wherein the second channel is spaced apart from and parallel to the first channel, the second channel intersecting the pin receiving recess.

4. The hand tool of claim 3 wherein the elongated, rigid loop body has a pair of parallel, loop body legs spaced a predefined distance from each other wherein the predefined distance is provided to permit disposing the pair of parallel, loop body legs into the first channel and the second channel with the lanyard attaching loop end directly connected to a first leg end of each of the pair of parallel, loop body legs and a tool attaching end opposite the first leg end of each of the pair of parallel, loop body legs wherein each tool attaching end of the pair of parallel, loop body legs has a through opening aligned with each other and disposed in the respective first channel and the second channel wherein each through opening of the tool attaching end of the pair of parallel, loop body legs intersects the pin receiving recess.

5. The hand tool of claim 1 wherein the lanyard attaching loop end is angled to the elongated loop body.

6. The hand tool of claim 1 wherein the lanyard attaching loop end is rotatably connected to the elongated loop body.

7. A method of providing a lanyard attachment point on a hand tool, the method comprising:

providing a hand tool having a hand tool body and a working side along a portion of the hand tool body wherein at least a portion of the working side is a straight edge, a pin receiving recess in the hand tool body wherein the pin receiving recess extends parallel to and spaced from the straight edge, the straight edge having a first channel that extends into the hand tool body and transverse to the straight edge wherein the first channel intersects the pin receiving recess;

providing a lanyard loop having an elongated, rigid loop body with a lanyard attaching loop end and a tool attaching end opposite the lanyard attaching loop end, the tool attaching end having a through opening transverse to the elongated, rigid loop body;

providing an anchor pin;

inserting the tool attaching end of the lanyard loop into the first channel of the straight edge;

aligning the through opening of the tool attaching end with the pin receiving recess; and inserting the anchor pin into the pin receiving recess and through the through opening of the tool attaching end of the lanyard loop thereby rotatably retaining the lanyard loop to the straight edge of the hand tool, wherein in any rotated position about the anchor pin, the lanyard loop defines a closed loop capable of retaining a lanyard.

8. The method of claim 7 wherein the hand tool providing step includes providing a channel that permits the lanyard loop to rotate away from the straight edge to not interfere with use of the straight edge.

9. The method of claim 7, further comprising providing a lanyard loop having a lanyard attaching loop end that is angled to the elongated, rigid loop body.

10. The method of claim 7, further comprising providing a lanyard loop having a lanyard attaching loop end that is rotatably connected to the elongated, rigid loop body.

11. A method of providing a hand tool having a working side that is a straight edge with a non-interfering lanyard attachment point, the method comprising:

forming a first channel in a portion of the straight edge wherein the first channel is transverse to the straight edge; and rotatably attaching a lanyard loop having an elongated, rigid loop body to the hand tool;

wherein the lanyard loop rotates within the first channel about a tool attaching end of the lanyard loop sufficiently so that the lanyard attachment point does not interfere with use of the straight edge of the hand tool; and wherein the lanyard loop defines a closed loop capable of securely retaining a lanyard in any rotated position about the tool attaching end.

12. The method of claim 11 further comprising providing a lanyard loop having a lanyard attaching loop end angled to the elongated, rigid loop body.

13. The method of claim 11 further comprising providing a lanyard loop having a lanyard attaching loop end rotatably attached to the elongated, rigid loop body.

14. The method of claim 11 further comprising:

(1) providing a second channel disposed in the portion of the straight edge wherein the second channel is transverse to the straight edge and parallel to the first channel; and (2) providing a pair of parallel, loop body legs that form the elongated, rigid loop body wherein the pair of parallel, loop body legs each has a tool attaching end rotatably attached to one of the first channel and the second channel.

* * * * *